United States Patent [19]
Novoa et al.

[11] Patent Number: 5,863,093
[45] Date of Patent: Jan. 26, 1999

[54] TRUCK CAB FRONT OPENING AND FIREWALL ASSEMBLY

[75] Inventors: Luis A. Novoa, Portland; Edmond Kalstiantz, Beaverton, both of Oreg.; Homer Franklin Wright, Jr., Vancouver, Wash.; Ernest Friesen, Portland, Oreg.

[73] Assignee: Freightliner Corporation, Portland, Oreg.

[21] Appl. No.: 736,312

[22] Filed: Oct. 24, 1996

[51] Int. Cl.[6] ........................................................ B60J 7/00

[52] U.S. Cl. ................................ 296/190.01; 296/190.08

[58] Field of Search ........................... 296/190, 1.1, 183, 296/187, 190.01, 190.08, 194

[56] References Cited

FOREIGN PATENT DOCUMENTS

| 254689 | 1/1988 | European Pat. Off. ............... 296/190 |
| 736445A1 | 10/1996 | European Pat. Off. . |

OTHER PUBLICATIONS

English Translation of EP0736445A1.

Primary Examiner—Stephen Avila
Attorney, Agent, or Firm—Klarquist Sparkman Campbell Leigh & Whinston, LLP

[57] ABSTRACT

An opening is provided through the front of a truck cab assembly during the manufacture process for allowing access to the interior of the truck cab for installing components therein. The opening most preferably substantially extends from sidewall to sidewall in the horizontal direction, and substantially from the roof structure to the floor structure in the vertical direction. On an assembly line, the front opening is preferably oriented perpendicularly to the direction of travel of truck cabs along the assembly line during a major portion of the vehicle truck cab assembly process. A firewall-dashboard assembly which facilitates easier installation and assembly of certain components is also disclosed. Specifically, the firewall is pre-assembled and combined with a dashboard sub-assembly prior to mounting these components to the truck cab. The firewall-dashboard assembly preferably contains at least the instrument panel, and the brake, clutch, and accelerator mechanisms. The firewall-dashboard assembly is mounted in part to rails along the floor of the truck cab structure. The firewall-dashboard assembly and door frames of the truck sidewalls include brackets which position the firewall to define the lower boundary of a windshield window opening.

11 Claims, 17 Drawing Sheets

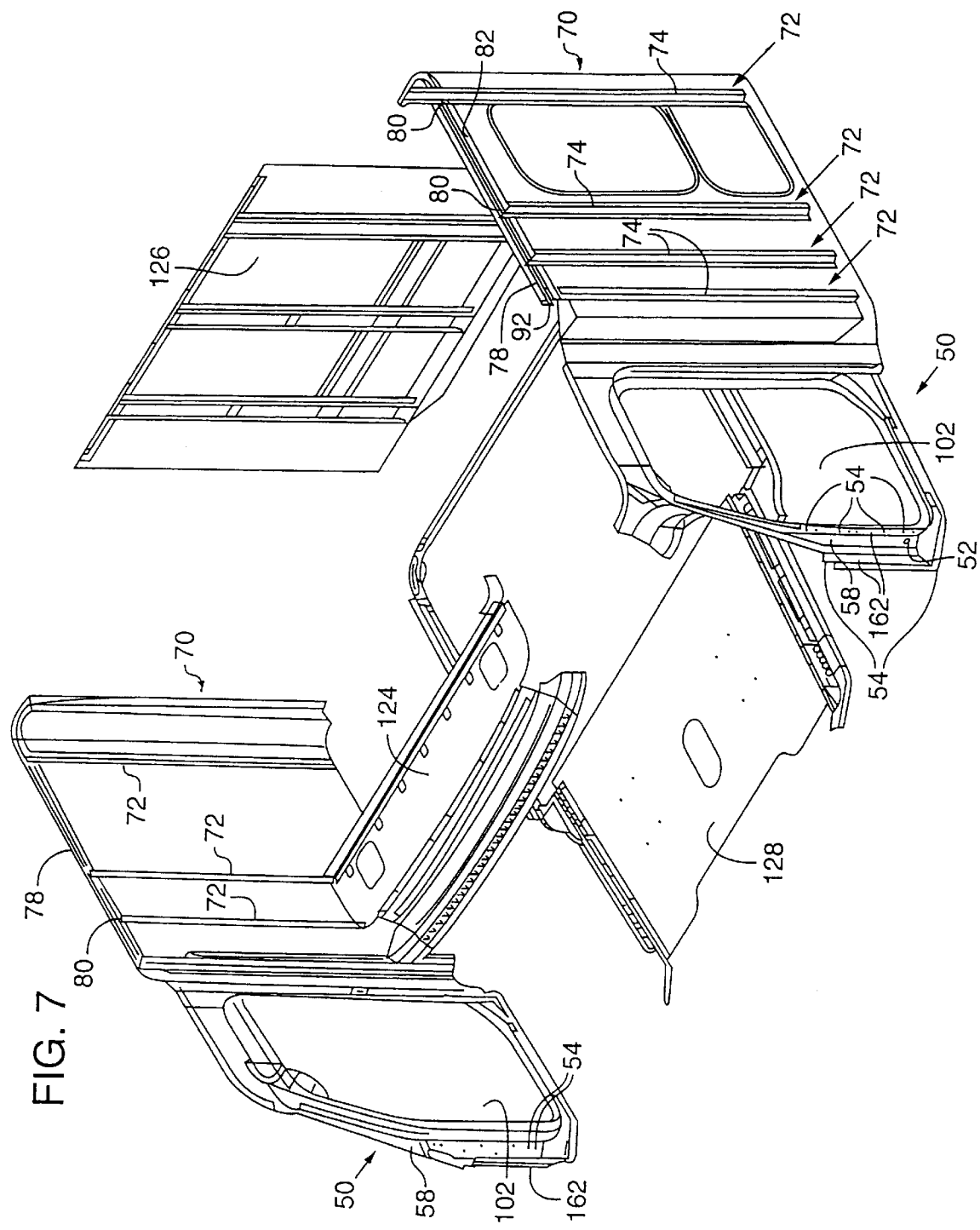

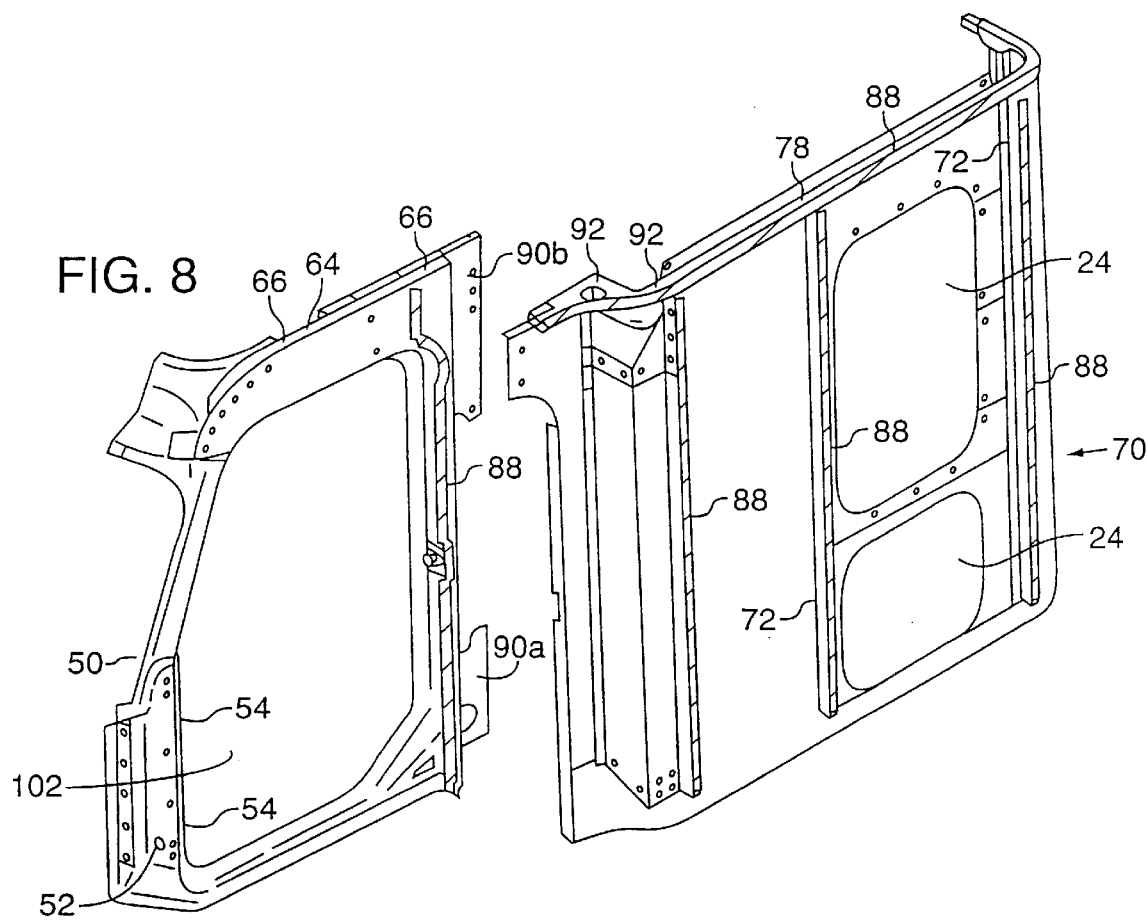

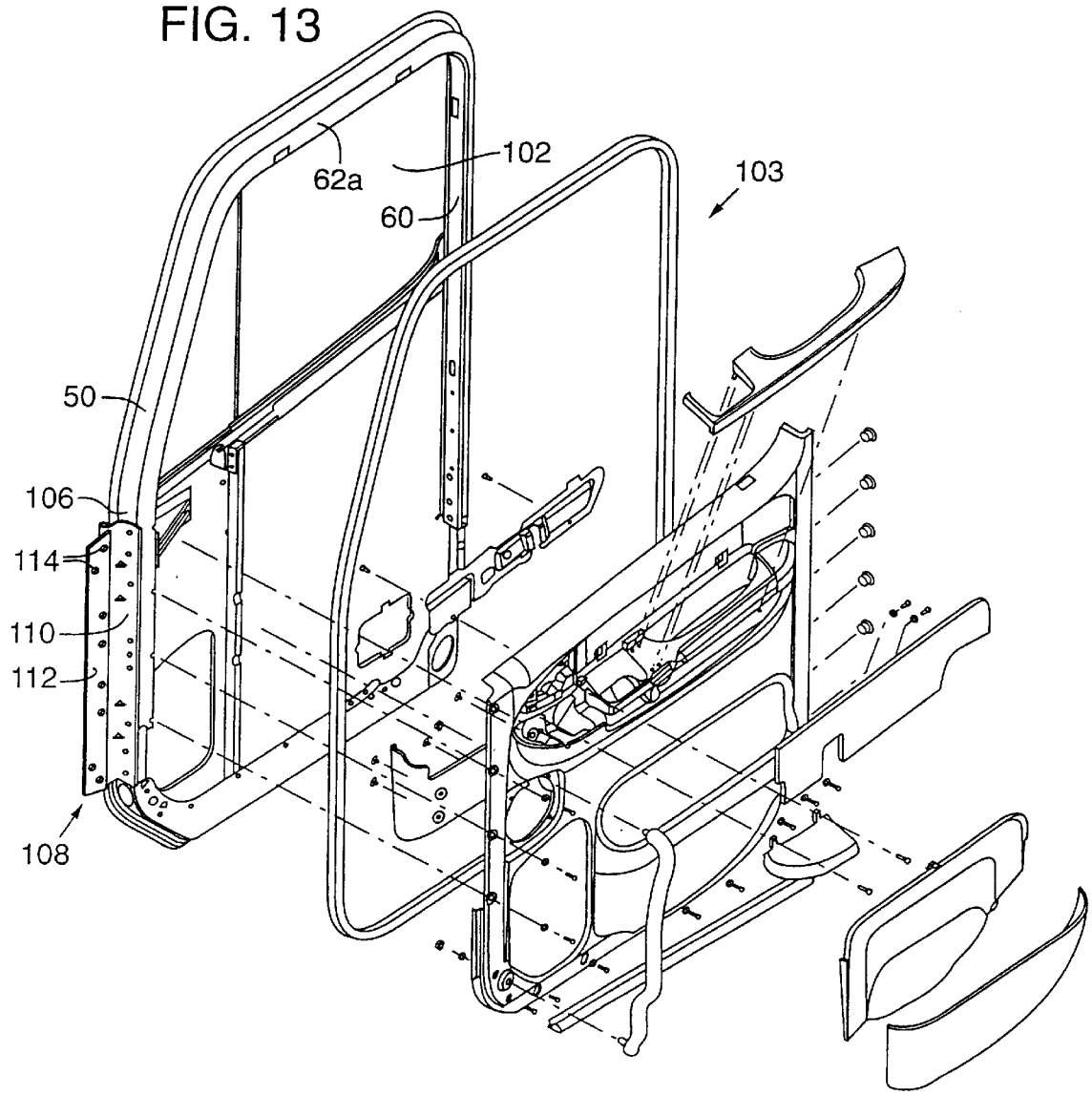

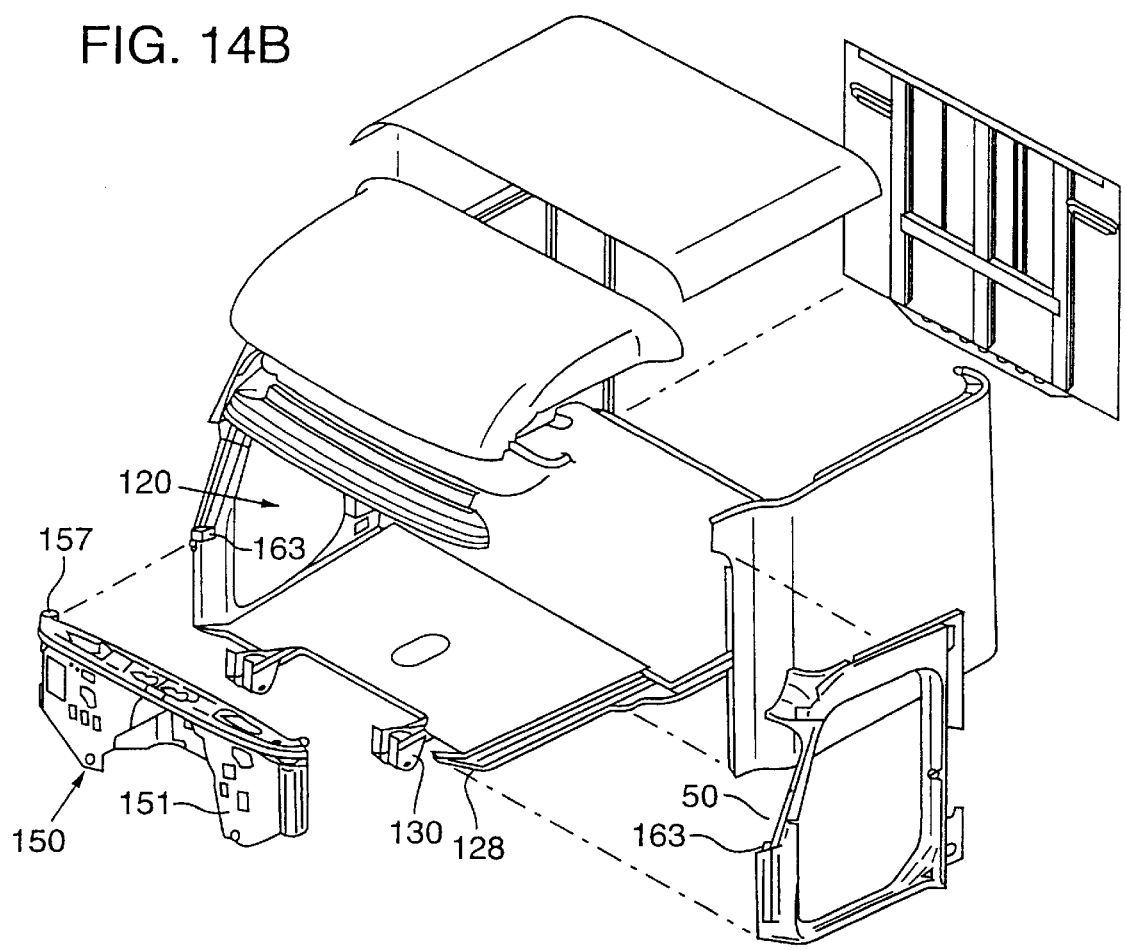

TRUCK CAB FRONT OPENING AND FIREWALL ASSEMBLY

FIELD OF THE INVENTION

The present invention relates to a vehicle assembly, and more particularly, a truck cab assembly having a front opening accessible during the assembly process, and a firewall sub-assembly, which is assembled in large part separately from the truck cab and then mounted to the cab to partially block access to the cab assembly through the front opening.

BACKGROUND OF THE INVENTION

The process of assembling a vehicle involves numerous components and assembly sequences. For instance, in typical truck assembly processes, it is often cumbersome to install interior components and equipment due to difficult access to the interior and the small confines once inside. For example, the individual components or sub-assemblies are carried into the interior of the truck cab through the door openings and installed in place.

In addition, with a multitude of components to be installed, numerous entries by various installers into the interior of the truck cab during the assembly process is obviously required. This often results in increasing the overall time typically required to manufacture the vehicle or truck cab.

Further, the truck cab assembly is often oriented in an awkward position on the assembly line, thereby making it difficult for workers to install particular components.

Therefore, a need exists for a process and truck cab assembly that overcomes the above-described and other problems typically associated with assembling a truck cab.

SUMMARY OF THE INVENTION

Accordingly, it is an object of the present invention to provide a process and truck cab assembly which is easier and less costly to assemble.

More specifically, the present invention provides for a partially assembled truck cab which allows for easier egress and ingress into the truck cab interior for installing interior components and equipment. In a partially assembled stage, the truck cab preferably comprises the sidewall assemblies (including the doors), a roof structure, a backwall, and a floor. As such, the truck cab has an opening through the front which essentially spans from the floor of the truck cab to the front edge of the roof structure, and horizontally from sidewall to sidewall.

The partially assembled truck cab is preferably positioned on the assembly line such that the opening in the front is oriented perpendicularly to the direction of travel of the assembly line. The front opening is oriented in this manner during a major portion of the assembly line and, preferably, for at least that portion of the line where the majority of truck cab interior components, such as cabinets, are installed.

Thus, workers can easily enter and exit the interior of the truck cab through the front opening during the assembly process to install the necessary equipment and components. This avoids the need to enter the truck cab through the narrower door openings, although the door openings are still available where they provide more convenient access for installation of selected interior components. In addition, by orienting the front opening perpendicularly to the direction of travel of the assembly line, workers can easily carry components and equipment from an area on the side of the assembly line into the truck cab without having to walk around or in front of the truck cab. This reduces installation time and eliminates obstacles in reaching the interior of the truck cab.

The present invention further provides for a firewall-dashboard assembly which is separately assembled to substantial completion prior to installation in a manner that would obstruct the lower portion of the front access opening. The firewall-dashboard assembly is most preferably essentially completed prior to installation on the truck cab. In other words, the firewall-dashboard assembly includes the firewall and most of the equipment and components normally associated with a firewall and truck cab dashboard, such as the gas, clutch, and brake mechanisms, and the operation and control instruments.

The firewall-dashboard assembly contains a plurality of holes for inserting fasteners therethrough in order to attach the assembly to the truck cab. In particular, fasteners can be inserted through holes in the assembly and through holes in front rails attached to the truck floor. Preferably, two spaced-apart and parallel front rails are provided on the cab floor for attaching the firewall-dashboard assembly. Likewise, fasteners can be inserted through outer edge portions of the firewall-dashboard assembly and into the front upright support elements of the door frame assembly. In this manner, it should be appreciated that the firewall-dashboard assembly can be constructed outside of the truck cab in an easier and more ergonomically efficient manner, without requiring an installer to climb into the truck cab to install individual components.

The present invention is directed toward the above objects and advantages individually as well as collectively. These and other objects, advantages, and features will become more apparent with reference to the following description and Figures.

BRIEF DESCRIPTION OF THE DRAWINGS

FIG. 7 is an exploded perspective view of a truck cab assembly with sidewall skins of FIG. 2 (the skin at the driver's side of the truck being depicted as if it were transparent to show a sidewall frame underneath the skin).

FIG. 8 is a side elevational view of an exemplary underlying frame structure (including the door frame) to which a sidewall skin of FIG. 2 (shown in the same manner as in FIG. 7) may be mounted, for example by adhesives, when used in a truck sidewall.

FIG. 13 is an exploded perspective view of a vehicle door showing a hinge mounted to a front edge of the door and with a forwardly extending hinge flap for mounting to an exterior surface of the door frame.

FIG. 14B is an exploded perspective view of the cab of FIG. 14A.

DETAILED DESCRIPTION OF THE PREFERRED EMBODIMENTS

A truck cab assembly is illustrated with a front opening to facilitate installation of interior components. The cab assembly is described with a door frame is typically incorporated into a sidewall of a truck cab during the manufacture of a truck cab. The door frame and sidewall may be formed in any convenient manner, including prior art approaches. However, for convenience and without limiting the breadth of the invention, specific door frame and sidewall manufacturing approaches are described below.

SIDEWALL SKIN FORMATION

Figure 1:
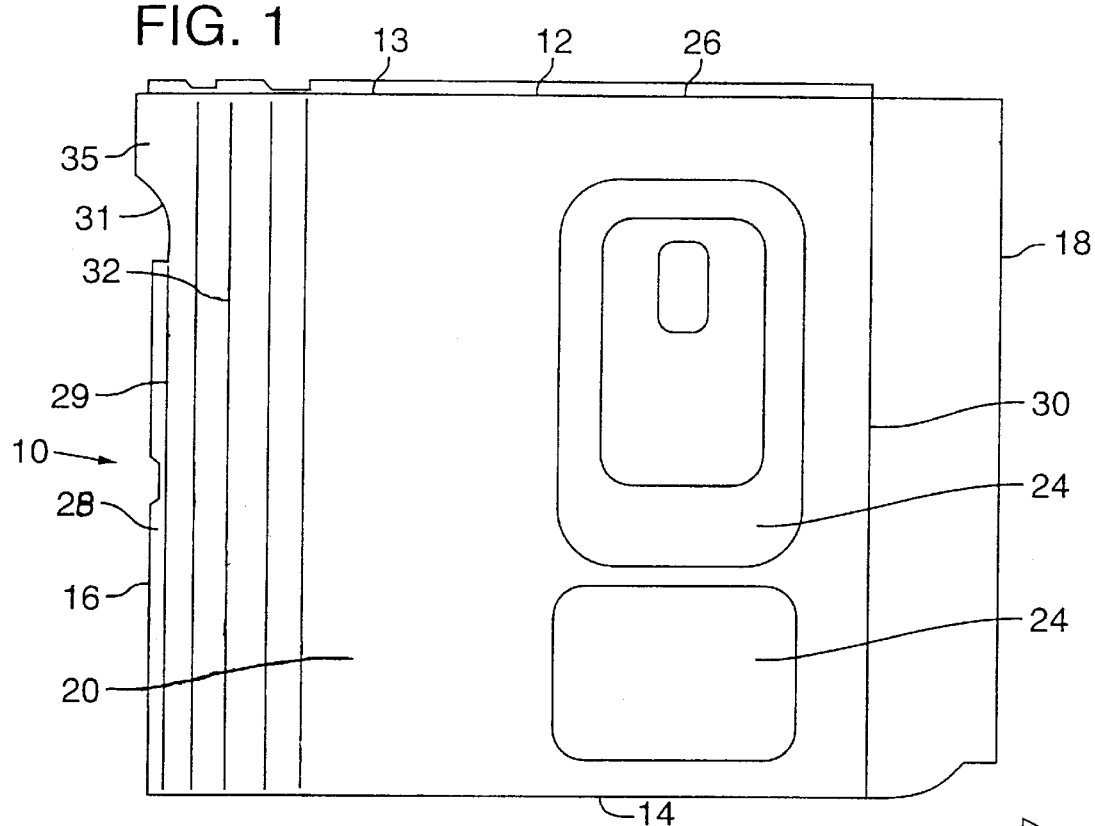
FIG. 1 is a side view of a blank used in the manufacture of one embodiment of the sidewall.

FIGS. 1 through 5 show a sidewall skin 10 of one form and a method for making this form of sidewall skin. Referring to FIG. 1, a blank for forming the sidewall skin 10 is shown. The sheet is preferably of metal and has a top edge 12, bottom edge 14, and front and rear edges 16, 18. The sheet also has a first exterior side surface 20 and a second interior side surface 22 (FIG. 4) opposite the first exterior side surface. Optional openings 24 may be formed or cut out of the blank to provide access through the sidewall and into storage spaces or compartments to be located within the truck cab. In other words, openings can be selectively cut in the sheet material blank between the major opposed surfaces to provide access to the cab's storage compartments or for other purposes.

Figure 2:
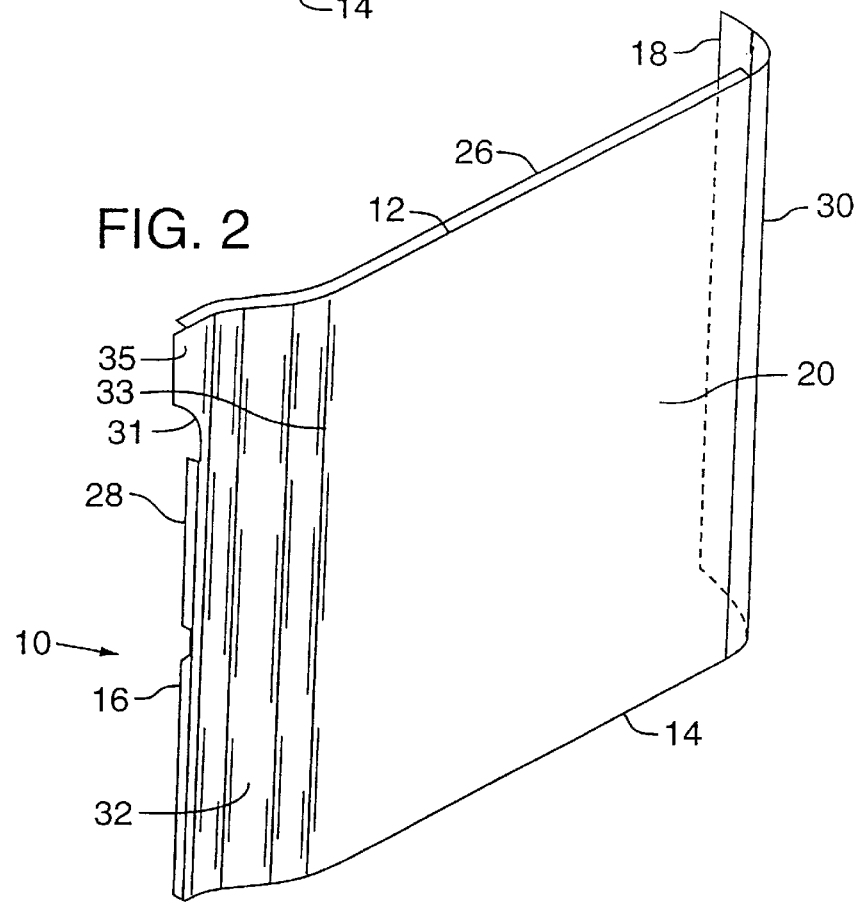
FIG. 2 is a perspective view of one embodiment of the sidewall of FIG. 1.

As shown in FIGS. 1 and 2, in particular, an inwardly directed flange 26 is formed along a fold line 13 at the top edge 12 of the sidewall skin 10. The fold line 13 as well as line 29 and other fold lines on the blank are imaginary and are simply shown for purposes of illustrating locations where the sidewall is bent. As will be discussed in more detail below, and as shown in the figures, the top flange 26 may be provided and utilized, for example, in attaching the sidewall to an underlying frame structure of the truck cab. As also shown in FIGS. 1 and 2, a front flange 28 may be formed along a fold line 29 adjacent to the front edge 16 of the sheet metal. The front flange 28 projects in a first or inward direction, in this case in a direction towards the interior of the cab when the sidewall skin is incorporated into the cab. The front flange 28 is preferably upright or vertically oriented. The flange 28 is sized and positioned for attachment to a door frame so that the front edge of the sidewall skin can be rigidly and securely fastened to the underlying framework of the truck cab. The blank has an upwardly and forwardly extending arcuate edge 31 above the line 29. As a result, a skin flap 35 is available for mounting to the door frame above the door.

As shown in FIG. 2, a rear corner 30 may be formed at a location of the blank inwardly from the rear edge 18. The portion of the sidewall skin between the rear 18 edge and the rear corner 30 comprise a portion of a rear wall of the assembled truck cab. Also, a portion of the sidewall skin between the front flange 28 and the rear corner 30 may comprise a transition region 32 of the sidewall of the truck cab. More specifically, in the illustrated form, the transition region 32 commences at a location just rearwardly of the line 29, and terminates at a location 33, which is typically no more than about one-fifth of the overall width of the sidewall skin. The transition region is optional and is preferably included in trucks of a design which have a wider rear sleeper cab portion than the front portion of the cab.

Figure 3:
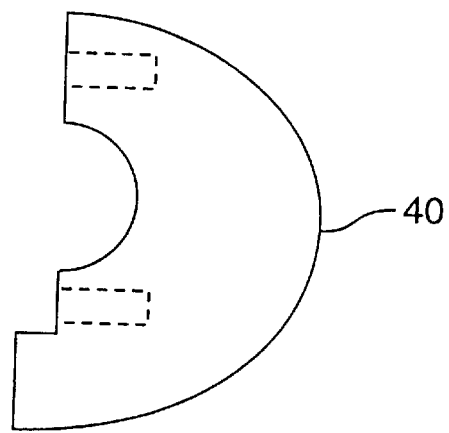
FIG. 3 is a side view of an arbor for a roll forming machine which may be used to form a rear corner in the sidewall of FIG. 1.
Figure 4:
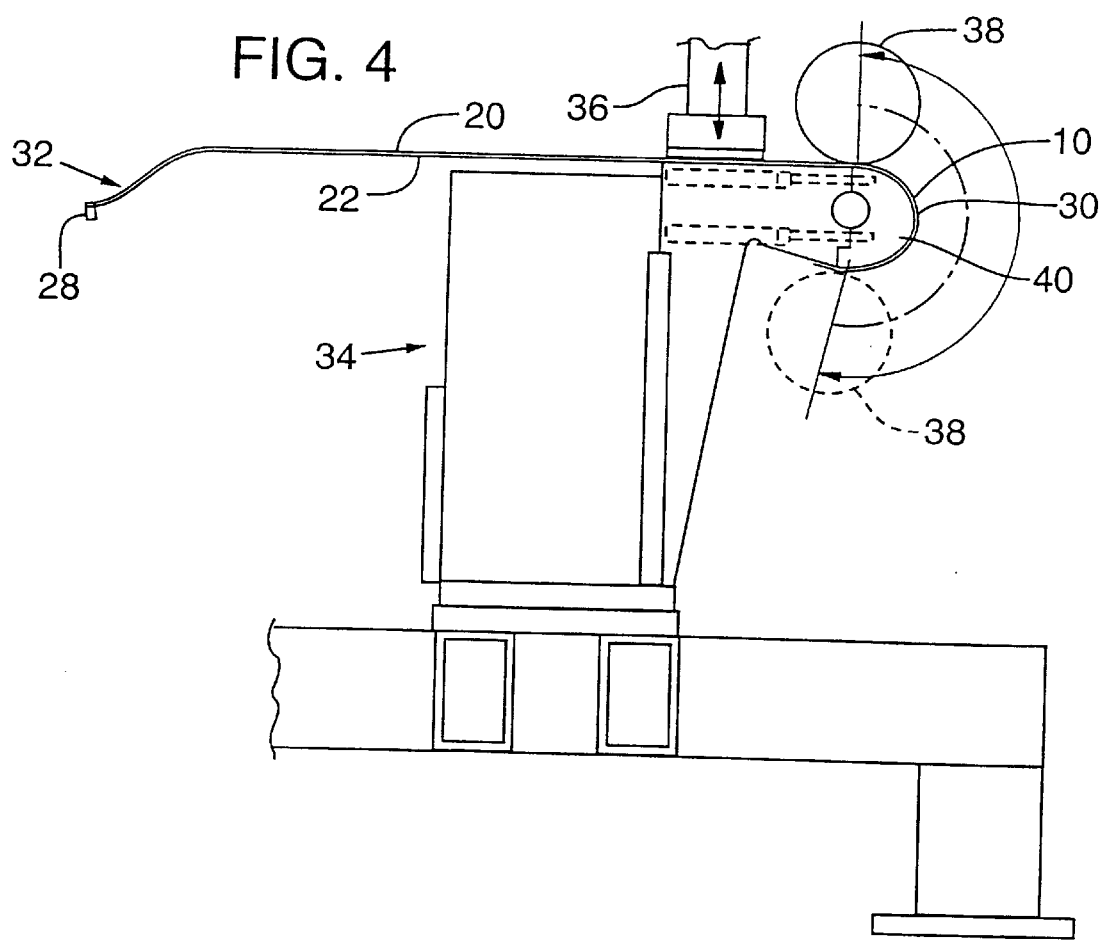
FIG. 4 is a side view of a roll forming machine used to form the rear corner of the sidewall of FIG. 1.

Although it may be formed in other ways, as shown in FIG. 4, the rear corner 30 is preferably formed by a roll forming technique. The sidewall 10 is placed substantially horizontally on a roll forming machine 34. A press 36 is used to retain the blank on the roll forming machine 34 in order to prevent it from moving while forming the rear corner 30. A roller form bar 38 is used to form the rear corner 30 in the blank. To form a 90 degree corner, the blank is bent to a greater extent than 90 degrees to accommodate spring-back. For example, for an aluminum blank of 50 mil aluminum, and as shown in FIG. 4, the roller form bar 38 rolls along an essentially 170 degree rotational path. Thus, not only does the roller form bar 38 rotate along its axis, it also follows a rotational path in order to form the rear corner 30 of the sheet metal 10. By following a 170 degree rotational path, a 90 degree corner 30 is essentially formed in the sidewall. In other words, although the sheet metal is bent more than 90 degrees as the roller bar 38 travels along a 170 degree path, the sheet metal springs back to form a 90 degree corner. FIG. 3 shows a side view of a form of arbor 40 used to form the rear corner of the sheet metal. More specifically, the roller bar 38 rolls along the path formed by the exterior surface of the arbor 40. As shown in FIG. 4, the sidewall is held between the roller bar 38 and arbor 40 during the process of forming the corner.

Again, as shown in FIG. 2, a transition region 32 is preferably formed in the sheet metal. The transition region 32 is spaced rearwardly of the front flange 28 and forwardly of the rear corner 30 of the sheet metal 10. The transition region is stepped inwardly (moving from back to front along the sidewall) with respect to a plane containing a major portion of the exterior surface 20 of the sheet material. In other words, the transition region 32 is stepped inwardly toward the interior of the truck cab. The transition region preferably extends vertically between the top 12 and bottom 14 edges of the sheet metal or skin.

Figure 5:
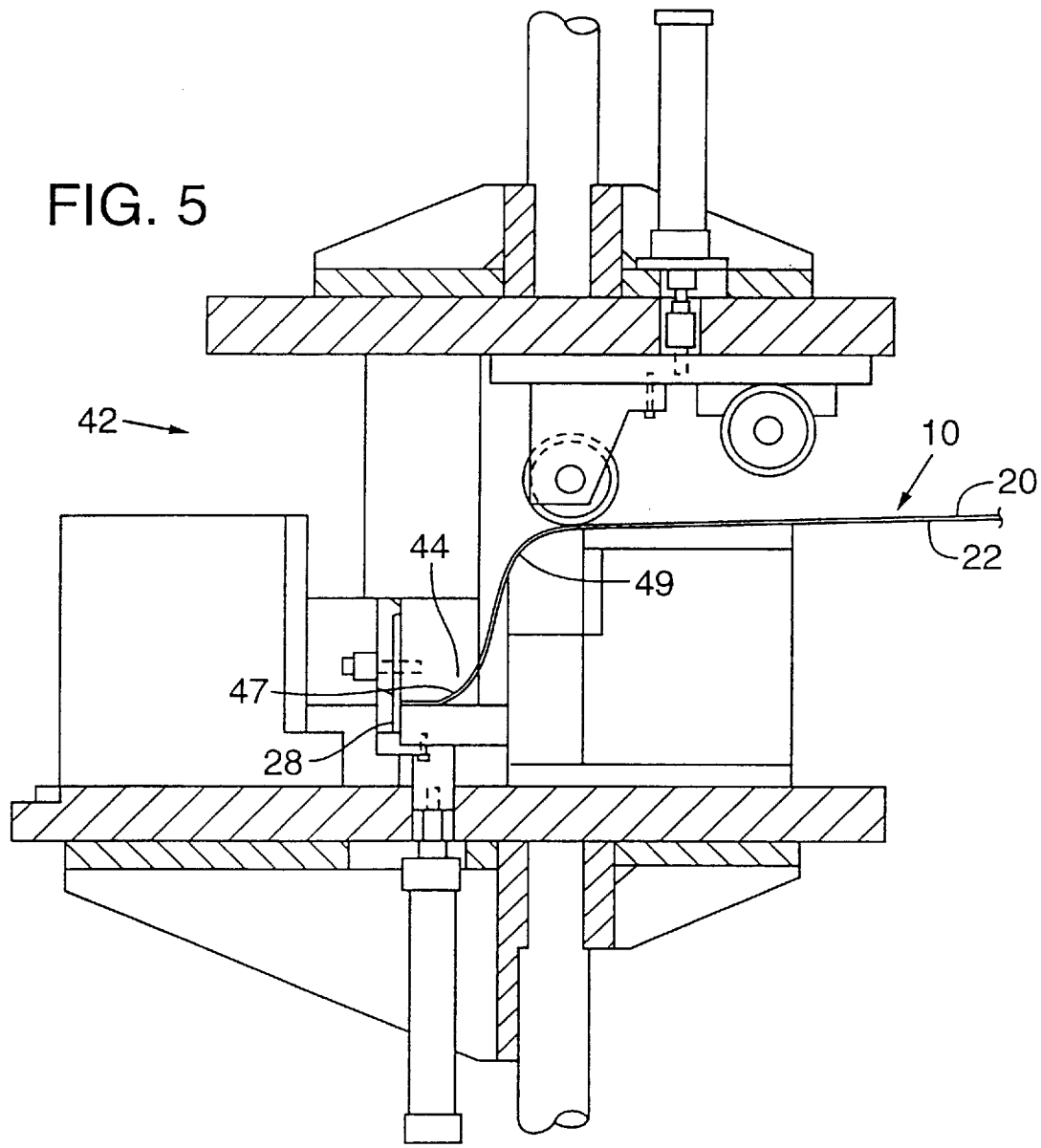
FIG. 5 is a die-press machine which may be used to form the transition region of the sidewall of FIG. 1 in a single pressing step.

Although other techniques may be employed, the transition region is preferably formed in a single step utilizing a die-press 42 (FIG. 5). Thus, both bends which make up the transition region are formed simultaneously in a common manufacturing step by the die-press 42. The die-press includes a die 44, 45 with curved surfaces 47, 49 which form the inwardly stepped transition region 32 when pressed against the sheet metal 10 as shown in FIG. 5. As shown in FIG. 2, the illustrated transition region is generally of an "S-shaped" cross-section. As shown in FIGS. 4 and 5, during formation of the transition region, the skin 10 is typically supported in a horizontal orientation during the forming steps, with the interior surface 22 positioned below the exterior surface 20, and the interior surface supported from below.

Preferably, when constructing the sidewall 10 the front flange 28 is first formed along the front edge 16 of the sheet. Consequently, the front flange 28 may be gripped 28 may be gripped by die-press 42 when the transition region 32 is formed. The transition region 32 is then formed using the die-press 42. The top flange 26 is then formed along the top edge 12 of the sheet and the rear corner 30 is then formed. However, if openings 24 are provided through the sheet, as discussed above, they are preferably cut before forming the flanges, transition region, and rear corner. Typically, multiple sheets are stacked and the openings are simultaneously cut in the sheets, such as by using an NC router.

During each of the skin formation steps, the blank may be supported from below on interior side 22. Consequently, possible marring and scratching of the exterior surface 20 is minimized.

It should be appreciated that the skin can be formed in alternative ways.

TRUCK DOOR FRAME

Figure 6A:
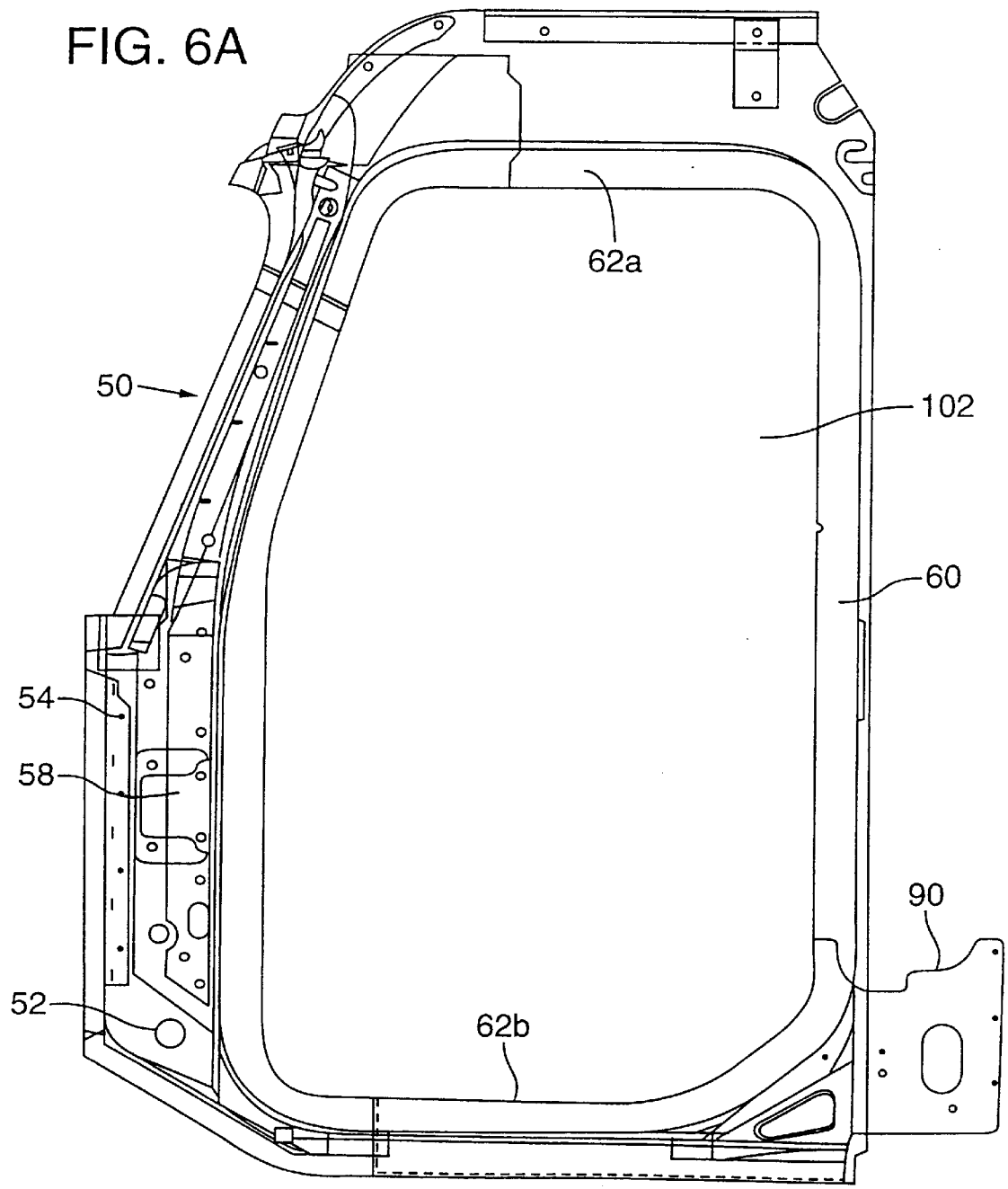
FIG. 6A is a side view of one embodiment of a door frame which may be used in combination with the sidewall skin of FIG. 2 in a truck sidewall assembly.
Figure 6B:
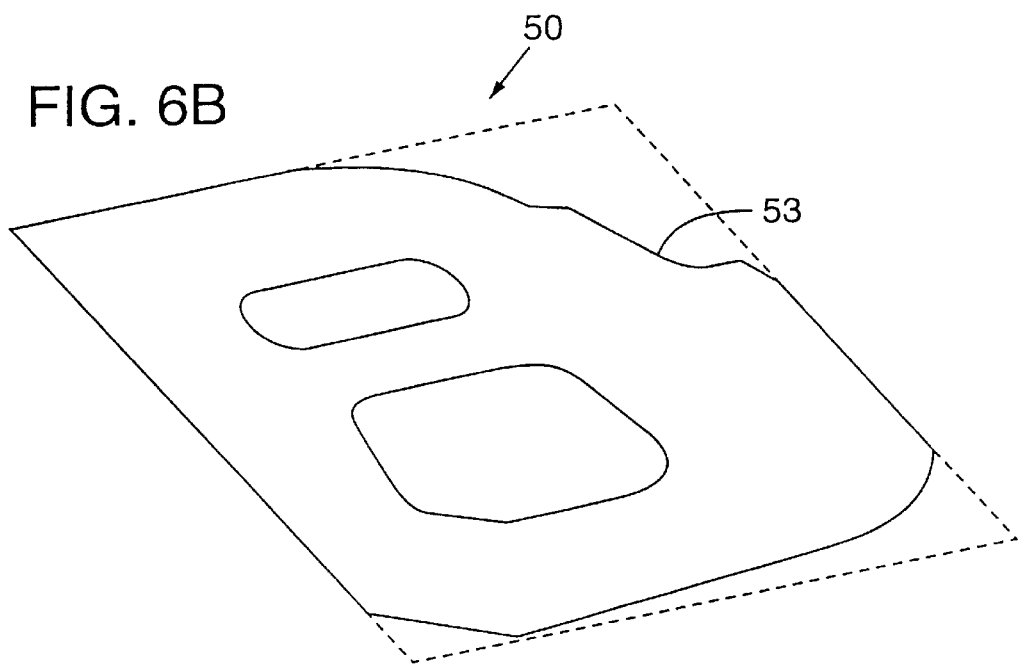
FIGS. 6B–6F illustrate one exemplary sequence of forming the door frame of FIG. 6A from a monolithic piece of sheet metal.
Figure 6C:
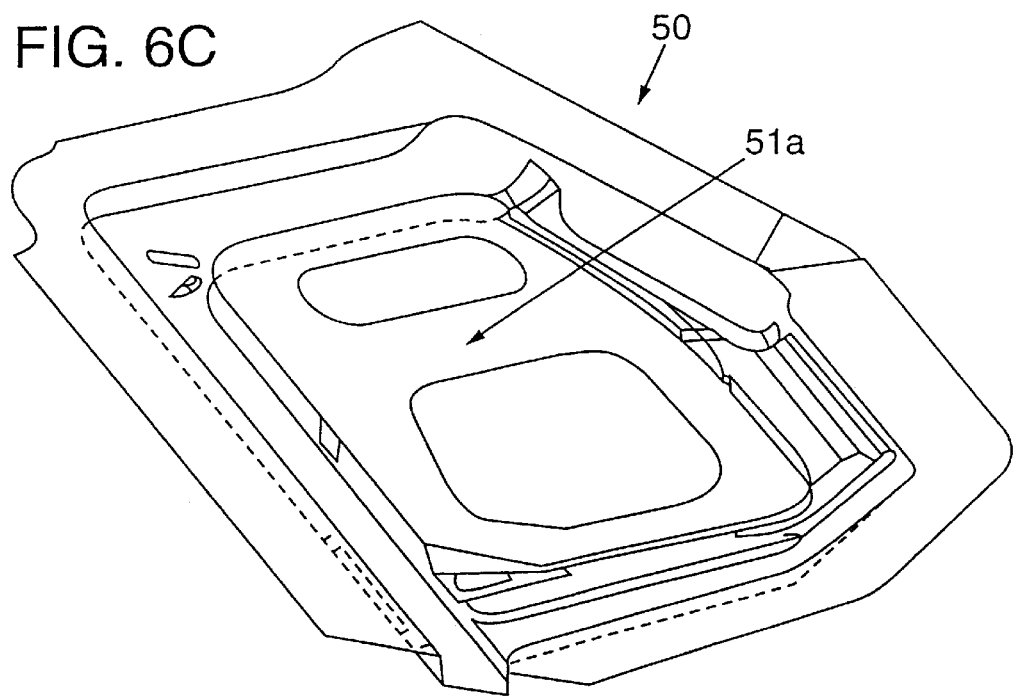
Figure 6D:
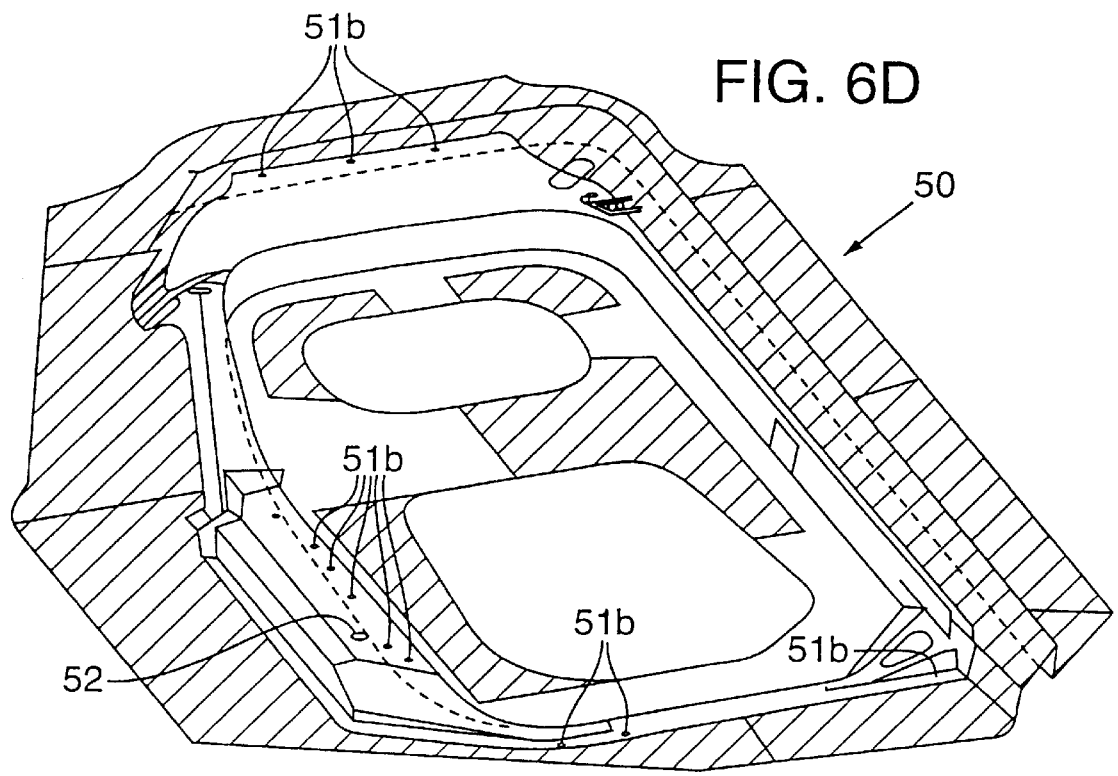

The front flange 28 of the skin may be affixed to a rear upright element of a door frame. The door frame may take any convenient form, including prior art forms. However, one suitable door frame assembly 50 is shown in FIG. 6A. This particular door frame is structurally strong and rigid. FIGS. 6B–6F show an exemplary sequence for forming the door frame of FIG. 6A from a monolithic sheet or blank, such as of metal. The door frame may be formed using a double-action toggle press with die cushion in bed. The sheet metal blank is first pre-drawn and cut along boundary 53 to take the form shown in FIG. 6B. The sheet is then drawn or die-pressed and cut as shown in FIG. 6C. A nitro pad is placed in the area indicated by arrow 51a. As illustrated in FIG. 6D, the blank is restruck and trimmed (with the cross-hatched areas removed) and then pierced with holes where indicated by arrows 51b. Hole 52 is a pilot or gauge hole which may be used as a reference when assembling the truck cab.

Figure 6E:
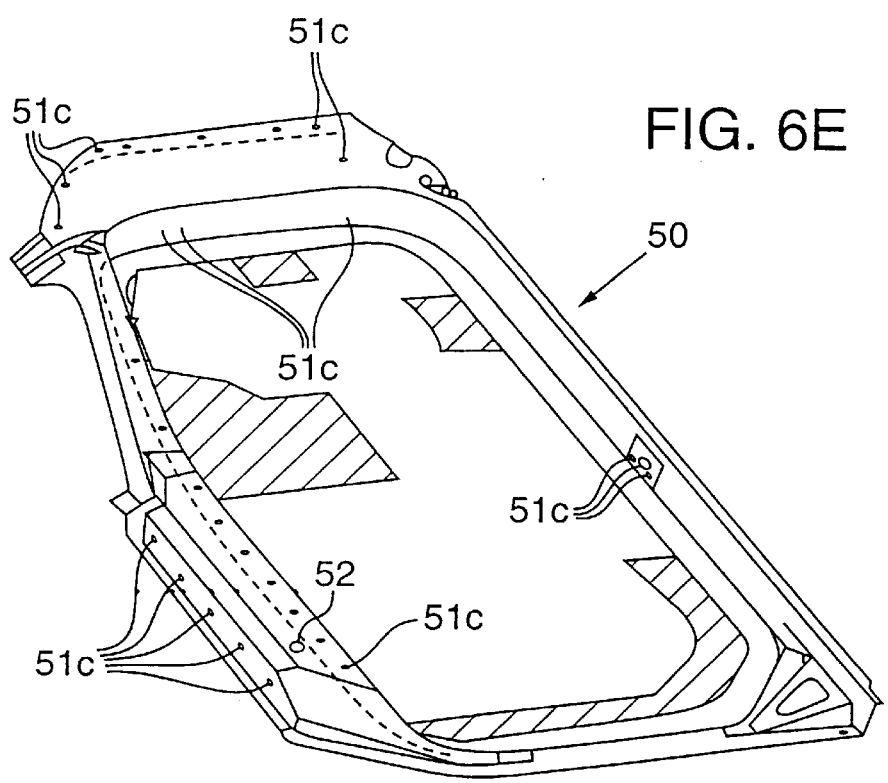
Figure 6F:
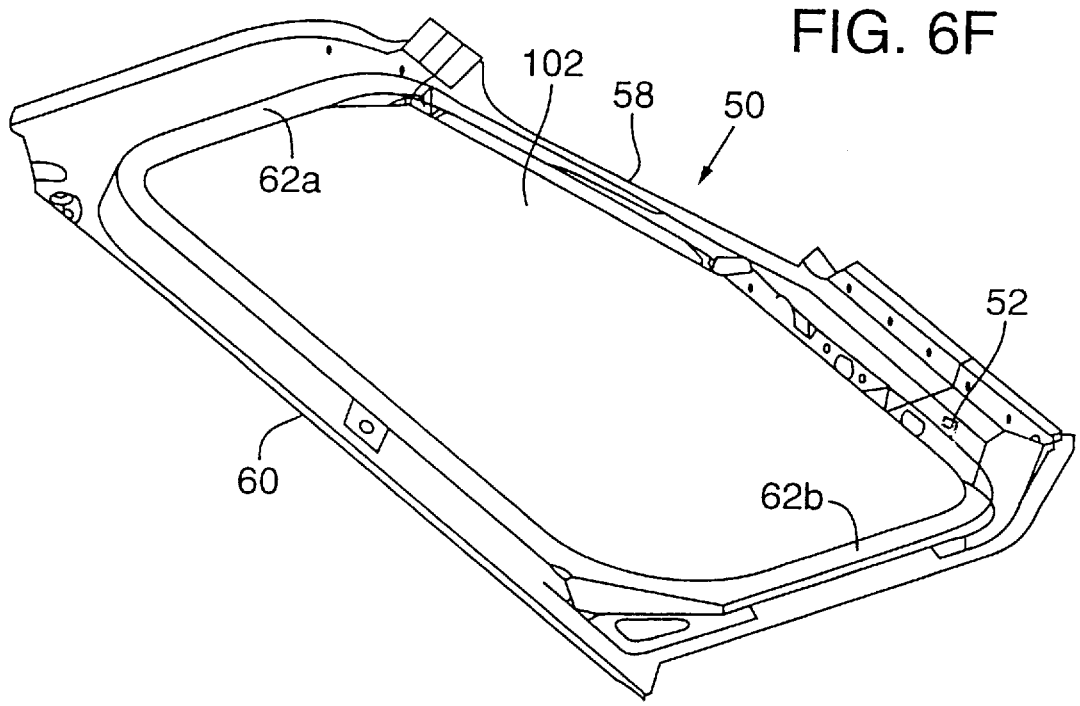

FIG. 6E illustrates, by arrows 51c, locations where holes are cam punched, and identifies further trim (see the cross-hatched areas) and restrike areas. Finally, FIG. 6F shows the illustrated door frame following these steps.

Although not necessary for this invention, the door frame 50 is preferably stamped or formed from a single or monolithic piece of sheet metal. By doing so, numerous pieces typically used to comprise a truck cab door frame are eliminated. Further, the illustrated door frame is preferably constructed to enclose or bound the entire perimeter of a door opening. As a result, the door frame is strong and is also relatively easy to install.

The blank used to make the door frame is preferably sheet metal with an aluminum 5052 alloy commercially available from Alcoa Aluminum Co. being a specifically preferred material. The sheet metal is preferably 50 mil thick. Again, the door frame 50 most preferably has a pilot or gauge hole 52 for use in positioning the frame and aligning components relative to the gauge hole during cab assembly. For example, a protruding alignment pin from a jig or positioner (not shown) can be inserted through the pilot hole 52 for retaining or holding the door frame, and for serving as a reference point to properly align the door frame and door (as well as sidewall) during the manufacturing process.

As shown in FIG. 6A, the door frame typically has a number of fastener receiving holes for attachment of other related truck cab components. For instance, the door frame may have a plurality of holes for attachment of a firewall-dashboard assembly to the truck cab assembly. The door frame may also have a plurality of holes 54 for receiving fasteners to attach a door to the frame by the use of a hinge.

The illustrated door frame 50 (see FIGS. 6A, 6F and 6G) has essentially two upright support elements, namely, a front upright support element 58 and a rear upright support element 60. The element 58 forms an outboard portion of an A-pillar or upright frame component forwardly of the door of the truck. A substantially horizontal frame support element 62a interconnects or extends between upper ends of the front upright support element 58 and the rear upright element 60. The upper surface 64 (FIG. 6G and FIG. 8) of the upper horizontal frame element contains a plurality of holes 66 for attachment of roof related structures to the truck cab. It should be understood, however, that the roof of the truck cab is not part of the present invention described herein, and that the truck cab roof can vary in design and structure and still be suitable for use with the present invention. A substantially horizontal support element 62b also interconnects or extends between the lower ends of the upright support elements 58, 60.

Figure 6G:
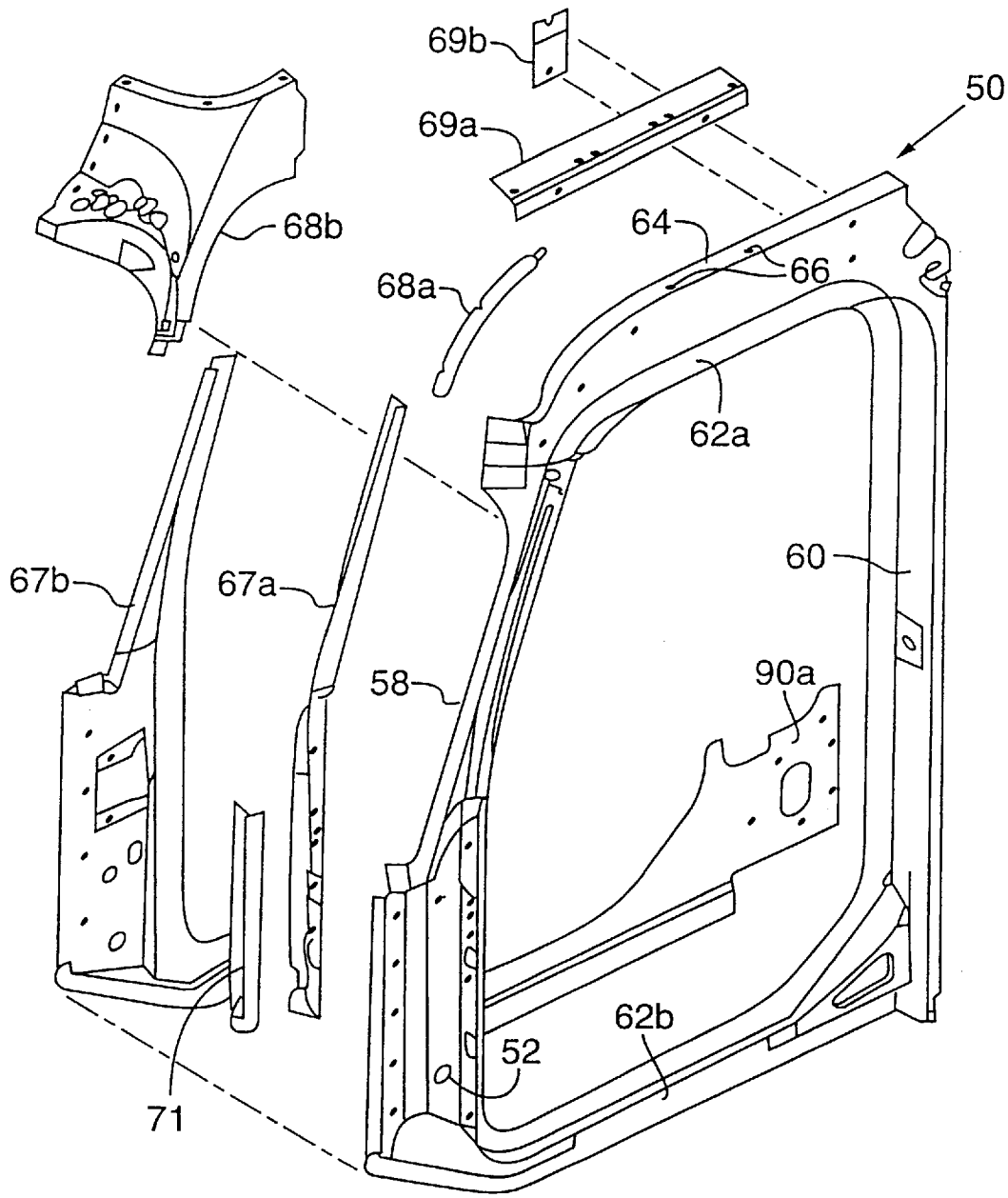
FIG. 6G is an exploded perspective view of a door frame assembly in which the door frame of FIG. 6A is shown together with additional components which may be attached thereto.

As shown in FIG. 6G, components may be added to the door frame 50 to form a door frame assembly. For example, an internal or first A-pillar reinforcement support 67a can be mounted to the front upright support element 58. An inboard or second A-pillar section 67b may also be mounted to the front upright support element 58. B-pillar bridging or reinforcing plates 90a, 90b (see FIG. 9) may also be mounted to the door frame. These reinforcing plates assist in rigidly connecting the door frame to rearward components of the truck sidewall. A sunvisor mounting bracket 68a and a sunvisor mounting back-up plate 69b may also be mounted to the upper horizontal interconnecting support element 62a of the door frame. A forward roof cross-piece section 68b may, in addition, be mounted to the door frame along with roof coupling element 69a. A door reinforcing bracket 71 may be mounted to the A-pillar forming components to back up a door hinge coupled to the door frame. The door frame assembly may, of course, be of a different construction and be comprised of different elements without affecting the present invention.

SIDEWALL ASSEMBLY

Figure 9:
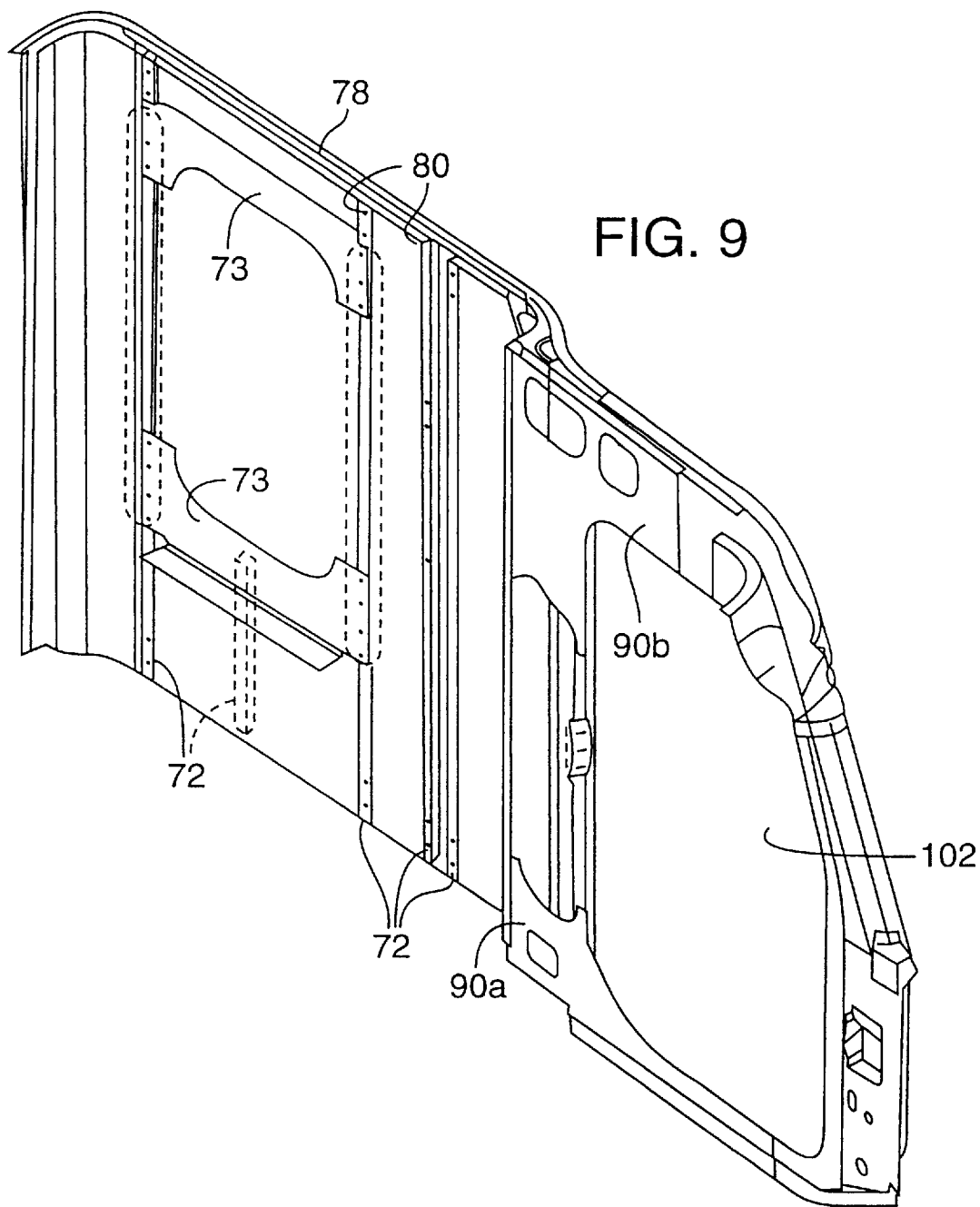
FIG. 9 is an interior perspective view of the interior side of the assembled truck sidewall of FIG. 8.

The sidewall underlying frame assembly 70 is best shown in FIGS. 7–9. As illustrated, the sidewall frame assembly preferably has a number of upright or vertical frame elements or studs 72 and opening bridging cross-pieces 73. The frame elements 72 have a first exterior surface 74 and a second interior surface opposite the first exterior surface. These frame elements may be of any suitable material, with aluminum (80 mil thick) being a specific exemplary material. The door frame 50 is fastened to the sidewall frame assembly 70 (see, for example, FIG. 9) to complete the underlying framework for the side of the truck cab. The illustrated sidewall frame assembly 70 has an upper elongated horizontally extending reinforcing element 78 (FIG. 7)

interconnecting upper ends 80 of the upright frame elements 72. The upper reinforcing element 78 has a first exterior surface 82 (FIG. 7) and a second interior surface opposite the first exterior surface. The pilot hole or gauge hole 52 in the door frame enables the frame assembly 70 to be aligned during the manufacturing process by inserting alignment elements or pins through the gauge hole when the sidewall skin is mounted to the frame. The upright frame elements 72 preferably extend substantially from the floor 128 to the roof structure 124 of the cab body. That is, the upright frame elements extend substantially to the top edge 12 of the sidewall 10 where the edge of the roof structure (not shown) joins the sidewall. The underlying frame is also attached to the door frame 50. As previously mentioned, the door frame assembly may have reinforcing plates 90a, 90b connected thereto. The sidewall frame 70 is coupled to the reinforcing plates 90a, 90b (see FIGS. 8 and 9).

The sidewall 10 is attached to the exterior surfaces 74, 82 of the frame elements 72, 78, and also to the frame element 60. Although rivets or other fasteners may be used, most preferably, adhesives are used to minimize the need to penetrate the sidewall with fasteners. Thus, in a preferred approach, adhesive is applied to the exterior surfaces 74, 82 of these frame elements (as illustrated by heavy black lines 88 in FIG. 8). Before applying the adhesive, the exterior surfaces 74, 82 of the upright frame elements 72, 78 are preferably wiped clean and scuffed to provide better contact with the adhesive, thereby forming a stronger bond between the sidewall 10 and the upright frame elements. One preferred adhesive is Betamate 73312/73313, a two-part adhesive, available from Essex Specialty Product of Auburn Hills, Mich.

In one manufacturing approach, following the application of the adhesive, the front flange 28 of the sidewall skin 10 is attached to the rear upright frame element 60 of the door frame, such as by using fasteners (such as rivets or bolts) extending through the flange and door frame. The rear edge 18 of the sidewall skin 10 is then pulled (in a direction towards the back of the cab or away from the door) to apply tension to the skin as it is positioned on the frame. For example, thirty to forty ft.-lbs. tension is applied to the skin. The tensioned sidewall skin is pressed or pulled against the adhesive on the exterior surfaces of the frame elements 72, 78 in order to secure the sidewall skin to the underlying frame assembly 70. More specifically, tension is applied along the sidewall skin in a front to rear direction to position it against the underlying frame. The skin thus adheres to the elements 72, 78 with the top edge 12 of the sidewall skin being positioned against the adhesive on the exterior surface of the upper reinforcing element 78. Clamps are preferably used to hold the skin against the adhesive. Although typically unnecessary, the top flange 26 of the sidewall skin may be mechanically fastened to the top surface 92 of the reinforcing element 78 by the use of fasteners or the like. Rather than totally eliminate such top edge fasteners, several spaced apart fasteners (e.g. 3 or 4), such as counter sunk screws, preferably are used along the top flange 26 along the transition region 32, a location of higher stresses, if the cab design includes such a region. It should, therefore, be appreciated that the sidewall is secured to the underlying frame assembly preferably without fasteners extending through the exterior side surfaces of the sidewall skin and into the frame elements. Thus, the surfaces of the sidewall skin, at least spaced from the edges of the sidewall, may be fastener free. It should be noted that during cab assembly, fasteners are commonly used along the bottom edges of the sidewall and at the rear of the truck.

The adhesive is then allowed to cure or is actively cured, for example by the application of heat. The edges of the sidewall skin are preferably clamped during the curing process to retain the sidewall in place. The clamps are removed after the curing process. Preferably, clamps are applied to the sidewall skin along the top edge of the frame and the sidewall is supported in a carrier during initial curing.

Once the sidewall skin 10 is adhesively (and mechanically, if some fasteners are used) secured to the sidewall frame assembly 70, the adhesive is most preferably actively cured. A single cure step may be used with the adhesive substantially totally cured during this step. For example, a fast curing adhesive may be used or a long cure time may be used under ambient conditions. Alternatively, heat may be applied to accelerate curing in a single curing step. However, a two-step heat curing process is preferred. In a first step, heat is applied to cure the adhesive sufficiently for handling purposes ("green" strength). The second step takes advantage of the fact that truck finishes, such as paint, are typically baked or heat cured. The second adhesive curing step is typically delayed until the paint baking step where it simultaneously is accomplished during paint curing. As a result, less additional energy is used to cure the adhesive. The curing process thus preferably comprises first and second heat curing steps. The first heat curing step again results in a partial curing of the adhesive, and the second curing step substantially completes the curing of the adhesive. The first heat curing step preferably occurs prior to the attachment of the sidewall structure to the other structures of the truck cab. The second curing step preferably occurs following the attachment of the sidewall structure to the remaining portions of the truck cab, such as after the truck cab is assembled. Most preferably, the second heat curing step preferably occurs simultaneously with a paint curing step after application of paint to the truck cab. The first or partial curing step gives the sidewall assembly "green" strength for handling during subsequent processing.

More specifically, during the first curing step, the sidewall assembly is pre-baked in order to partially cure the adhesive so that the assembly is sufficiently strengthened in order to be handled during the truck cab assembly process. Most specifically, the first curing step preferably involves heating the sidewall and frame to a temperature which is sufficiently high to accelerate initial adhesive curing to provide adequate sidewall handling strength within approximately one hour and sufficiently low so as to minimize thermal expansion mismatch between the frame and skin to thereby result in a substantially distortion-free exterior sidewall appearance when the sidewall is at or near ambient temperature. The first curing step produces a sidewall assembly (skin and frame) with structural handling strength without visible distortion of the skin exterior surface. By structural handling strength, it is meant that the sidewall assembly can be lifted, moved and installed on a chassis without the skin delaminating from the frame under typical manufacturing conditions. Preferably, although variable depending upon factors such as the type of adhesive being used, during the first curing step the sidewall assembly is heated at from about 120° F. to about 125° F. for a time of from about 75 minutes to about 80 minutes. In one specifically preferred approach, the initial cure step is accomplished by raising the temperature in an oven to 120° F. and holding the temperature at this magnitude for 75 minutes. During the second curing step, or paint curing step, the sidewall assembly is baked or heated for a time and at a temperature to substantially complete the curing of the adhesive for long-term (e.g. for the expected life of the truck) sidewall assembly durability. As a specific example, this second heat cure step may be a multiple stage process. For example, the sidewall (and cab assembly) may first be heated in an oven to 250° F. and held at this temperature for 15 minutes, then reduced to a temperature of 180° F. for 30 minutes, and then heated to 200° F. for 30 minutes.

The adhesive is preferably applied to the frame elements to eliminate "run out" (adhesive forming beads or running out beyond the edges of the frame elements) which could cause visible lines to be present at the exterior of the sidewall due to contraction or expansion of the sidewall during the final curing of the adhesive. Applying a single bead of adhesive to the center of the exterior surface of each frame element to be glued has proven effective. A robotic adhesive applicator, such as a three axis programmable applicator capable of moving along x, y and z axes (work envelope: x axis–75 inches, y axis–64 inches, z axis–10 inches) from Hi-Star, Inc. of Waterford, Mich. may be used to scuff the exterior frame element surfaces and to accurately apply the adhesive to the frame elements so as to eliminate undesirable "runout".

It should further be appreciated that the sidewall frame assembly can be formed and configured in alternative ways. For instance, the frame support may have horizontal supports in lieu of or in addition to vertical supports to which the sidewall skin is adhered.

DOOR INSTALLATION ASSEMBLY

Figure 11:
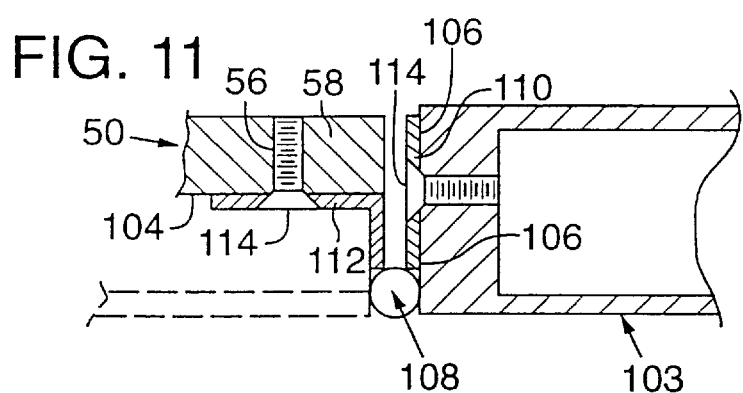
FIG. 11 is a horizontal cross-sectional view through a portion of a door and door frame.

As shown in FIG. 9, the door opening 102 is bounded or defined by the door frame 50, including the front upright element 58 (along the forward portion of the door opening) and rear upright element 60. The front upright element 58 has an exterior hinge mount receiving surface 104 (see FIG. 11). By exterior, it is meant a surface which is exposed at the exterior or outside of the cab during door assembly when the door is closed. The door 103 (partially shown in FIG. 11) has a fore side edge surface 106 which, when the door 103 is closed as shown in FIG. 11, is oriented perpendicularly to the exterior surface 104 of the front upright element 58. The door 103 also has an aft side edge surface (not shown) and top and bottom edge surfaces.

Figure 14A:
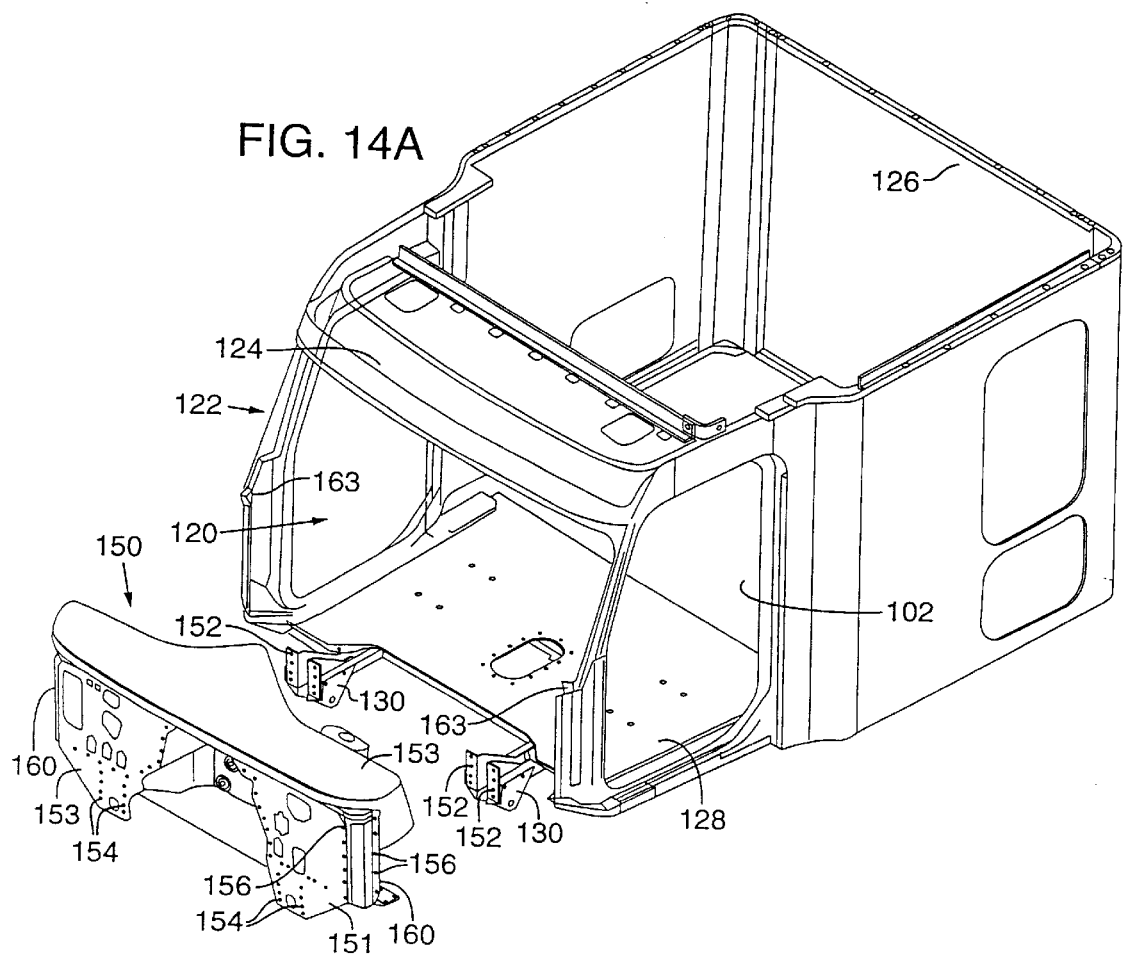
FIG. 14A is a front perspective view of a truck cab with a door frame and also including a representation of a firewall-dashboard assembly of the present invention.
Figure 15:
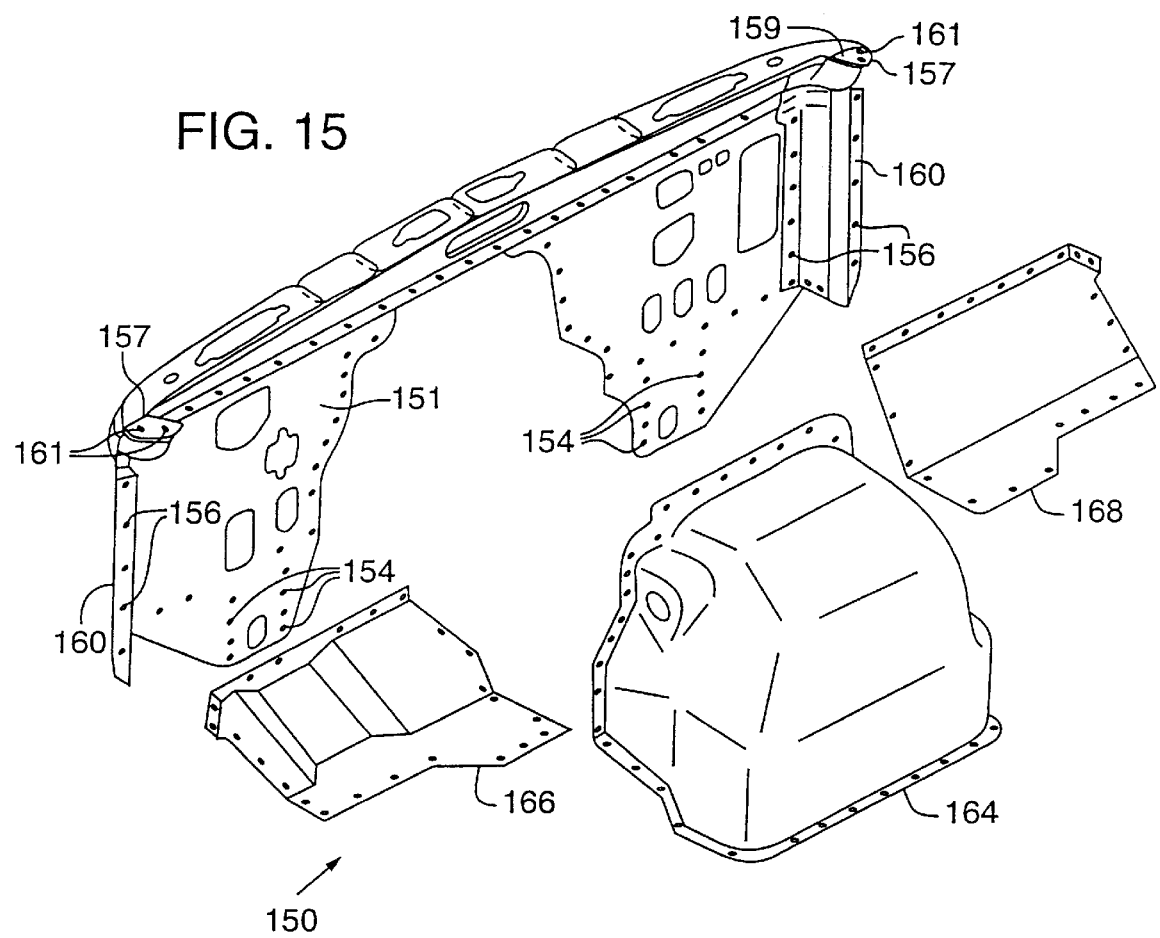
FIG. 15 is an exploded view of a truck firewall usable in the present invention.
Figure 16:
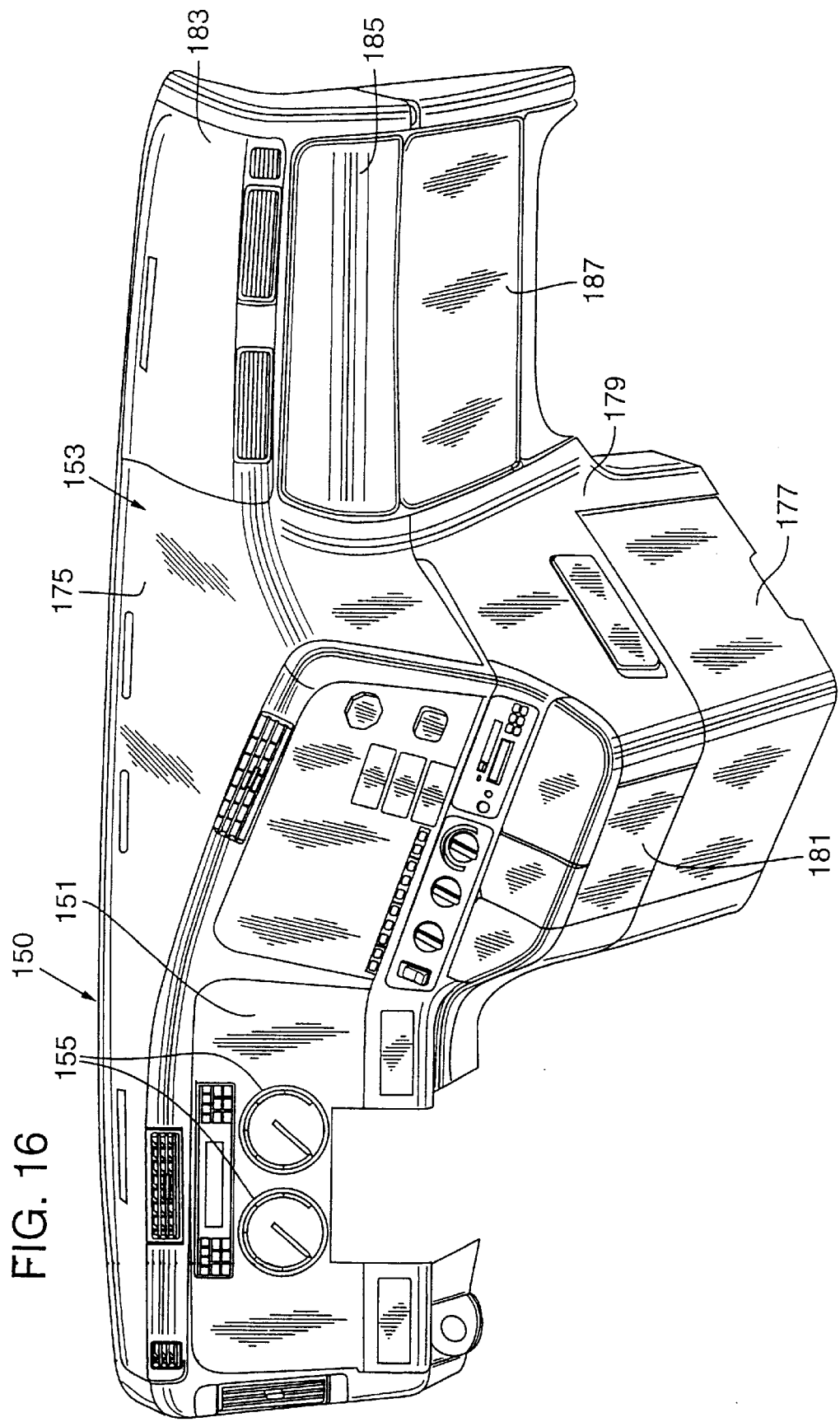
FIG. 16 is a perspective view of a form of firewall-dashboard assembly usable in the truck cab assembly of FIG. 14.

An elongated hinge, such as a piano hinge 108, may be used to mount the door to the door frame. In particular, the hinge 108 has a first hinge flap 110 (see also FIG. 13) and a second hinge flap 112. The first hinge flap 110 is mounted to the side edge surface 106 of the door 103 by the use of fasteners 114 or the like, such as screws. The door 103 is then placed in the opening 102 bounded by the door frame 50. At this point, the cab is typically assembled, as shown in FIG. 14A so that the door frame is fixed within the cab structure. However, door installation may be accomplished earlier in the truck cab assembly process (such as at the time the sidewalls are completed). The door 103 is typically supported by a jig and advanced by the jig into the door opening. The jig preferably includes spacers which establish the desired gap between the door opening bounding components and the door. The jig also typically includes an alignment pin which is inserted into the gauge hole 52 (e.g. see FIG. 9) in the frame to orient the door relative to the door frame.

When the door 103 is in the closed position (see FIG. 11), the second flap 112 of the hinge 108 is positioned where it may be placed against the hinge mount surface 104 and mounted thereto. The mount surface 104 would be located at the rear upright frame element if the door were to be mounted for opening in a counter-clockwise direction relative to the door frame instead of clockwise. The second flap 112 may be fastened to the exterior surface 104 of the front upright support 58 by the use of fasteners 114, such as, screws. Preferably, eight screws are used to fasten the second hinge flap 112 to the front upright support 58 of the door frame. When mounted in this position, the second flap 112 is substantially perpendicular to the first flap 110 of the hinge when the door is closed.

Figure 10:
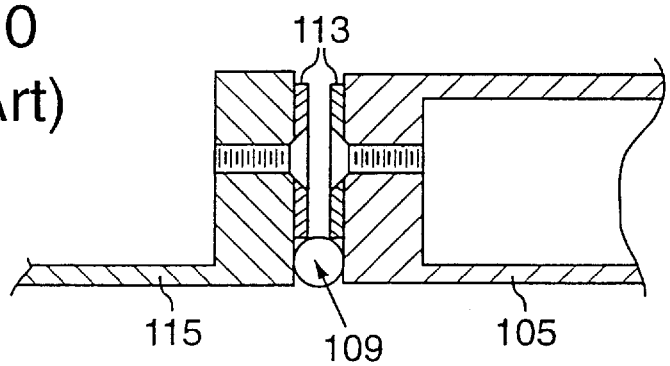
FIG. 10 is a horizontal cross-sectional representation of a portion of a prior art door and door frame in which the door is open during door installation.

It should be appreciated that this mounting method allows the door to be installed or adjusted in fore, aft, up, down and rotational positions and fastened in the closed position. This allows for proper alignment (fore, aft, up, down, and rotationally) of the door in the closed position without the necessity of opening and closing the door during the installation process (as in prior art devices and methods) in order to ensure that the door is properly positioned fore, aft, up, down and rotationally within the door frame. Some lateral (in, out) adjustment of the door is still performed with the door in the open position. In other words, prior art approaches (generally illustrated in FIG. 10) typically require that a hinge 109 be fastened with the door 105 in the opened position to allow access to the hinge flaps 113 as they are fastened to the edge of the door 105 and adjacent edge of the door frame 115. The door 105 is then closed in order to determine whether it is properly positioned in fore, aft, up, down and rotationally within the door frame 115. If not, such approaches require that the door be opened and the hinge realigned to better position the door. This process continues until the door is successfully aligned within the door frame. By allowing the door to be installed in the closed position, the need for iterative steps of door alignment during installation to accomplish fore, aft, up, down and rotational positioning is substantially eliminated.

CAB FRONT OPENING AND FIREWALL ASSEMBLY

Figure 12:
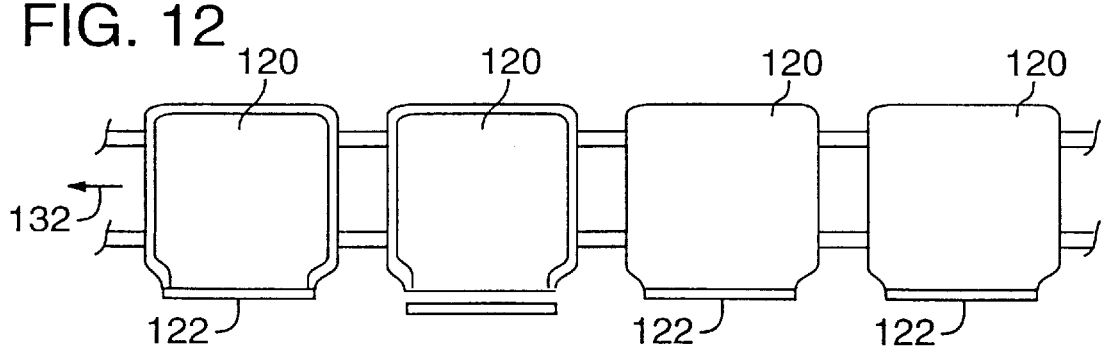
FIG. 12 is a schematic illustration of an assembly line for truck cab assemblies of the present invention.

With particular reference to FIGS. 12 and 14A–16, a manufacturing approach is illustrated which permits the installation of the interior components of a vehicle or truck cab through an opening 120 in the front of the truck cab assembly 122 prior to installation of a firewall-dashboard assembly 150. As shown in FIG. 14A, when partially assembled, the truck cab comprises the sidewalls, a portion of the roof structure 124, a backwall 126, and a floor 128. As shown in FIG. 14A, the cab floor 128 is mounted to a pair of parallel spaced apart longitudinally extending support rails 130. A bunk cross-piece (not shown in FIG. 14A) may also be included and extends transversely between the sidewalls in the rear sleeper area of the cab. In this state, with or without a roof structure, the cab is ready for installation of interior cab components. As discussed in more detail herein, the support rails 130 are also used in mounting the firewall-dashboard assembly to the truck cab. As can be seen in FIG. 14A, in this state of assembly without the firewall-dashboard assembly, the truck cab 122 has an unobstructed opening 120 through the front which essentially spans vertically from the floor 128 of the truck cab to the front edge of the roof structure 124, and horizontally from sidewall to sidewall. By unobstructed, it is meant that hood structures and forward frame structures blocking the portion of the opening below the window area of the cab are absent. Most preferably, a major portion (at least half) of this below window area is available for unobstructed access to the cab interior As schematically illustrated in FIG. 12, each such partially assembled cab structure 122 is preferably positioned on an assembly line such that the front opening 120 is oriented perpendicularly to the direction of travel (as indicated by arrow 132) of the assembly line during a major portion of the truck cab interior assembly process, and most preferably at least during installation of substantially all of the interior components. In this manner, workers can easily enter and exit the interior of the truck cab through opening 120 during the assembly process by simply walking into the cab structure through the front opening 120. As such, the interior components, such as carpeting, cabinets, and other equipment, can be more easily installed since the installer has essentially unobstructed access through opening 120 into the truck cab. Furthermore, with the present approach, the door openings remain available for use if more conveniently used in the installation of specific interior cab components.

Also, such components may be stored as subassemblies along the side of the assembly line where they may readily be picked up, moved through openings 120 and into the cab assemblies for installation. By orienting the opening perpendicularly to the direction of travel of the assembly line, the installer does not have to walk around obstacles or the cab to reach the interior. This reduces overall installation time and increases the ease of assembling the interior of the vehicle. Access is also improved to a lesser extent if the cab assemblies are positioned with the openings 120 oriented other than perpendicularly to the direction a cab travels during cab assembly.

In the absence of openings 120, as in typical prior art processes, the equipment installer must enter the cab structure primarily through the door openings 102. Since the door openings are much smaller and more difficult to access than the front opening 120 in cab assemblies of the present invention, it is more difficult for the equipment installer to enter and exit the vehicle, especially when carrying bulky components and equipment to be installed and if the doors are installed.

A firewall-dashboard assembly 150 is shown in FIGS. 14A, 14B, 15 and 16. The firewall-dashboard assembly comprises a firewall 151 pre-assembled to a dashboard assembly 153. The firewall-dashboard assembly is constructed prior to being mounted to the truck cab assembly 122 shown in FIG. 14A. The firewall-dashboard assembly is preferably a combination of a firewall assembly with a dashboard assembly which are combined into the firewall-dashboard assembly prior to installation on the cab assembly.

The dashboard assembly preferably includes the truck instrument cluster (the gauges are to be included on the truck such as indicated at 155, and typically many more), the wiring for the instrument cluster, switch panels and the main dash structure (for example the dash structure other than a dash cover panel 175, dash trash box and lower dash components 177, 179, 181 and heating, ventilation and air conditioning (HVAC) cover components 183, 185 and 187. These latter components may be omitted from the dashboard assembly, such as until after the firewall-dashboard assembly 150 is mounted to the truck cab). Other elements may be added to or deleted from the dashboard assembly as desired before it is combined with the firewall assembly.

The firewall assembly preferably includes the components making up the firewall structure and other components typically mounted thereto, such as the accelerator sub-assembly, clutch and brake sub-assemblies, HVAC sub-assembly (main unit, ducting and controls) and steering column sub-assembly. Other components, such as an air cleaner and surge tank, wiper motor and wiper linkages, air conditioning valves, electrical connectors, water and refrigerant lines and firewall lining and sound deadening materials, are most preferably also included with firewall assembly prior to mounting the cab assembly. Other elements may be added to or deleted from the firewall assembly before the combined firewall dashboard assembly is mounted to the cab assembly.

The pre-assembled firewall-dashboard assembly preferably contains, as a minimum, at least the instrument panel 155 (FIG. 16) (e.g. odometer, speedometer, and fuel and temperature gauges), substantially completed instrument electrical wiring, clutch assemblies, brake assemblies and an accelerator assembly. Most preferably, the HVAC sub-assembly is also included in the minimum pre-assembled firewall-dashboard assembly.

As shown in FIG. 14A, the front or forward end of the floor supporting rails 130 have a plurality of apertures or holes 152 therethrough for receiving fasteners which mount the firewall-dashboard assembly 150 to the truck cab. Likewise, the firewall-dashboard assembly has a plurality of corresponding apertures or holes 154 therethrough for receiving such fasteners. The firewall-dashboard assembly 150 also contains additional holes 156 for receiving fasteners for attaching it to the front edge of the door frame assembly 50. The front edge of the door frame assembly 50 likewise contains corresponding holes 54 (FIGS. 7 and 8) therethrough for receiving fasteners placed through such holes and the holes 156 in the firewall-dashboard assembly. In particular, the firewall-dashboard assembly 150 is attached at its edges or flanges 160 to corresponding portions 162 of the door frame structure (see FIGS. 7, 14A and 15).

Furthermore, the firewall 151 preferably has firewall mounting brackets 157 at each end of the firewall. Each mounting bracket 157 has a substantially horizontal plate 159 with fastener receiving holes 161 therethrough (see FIGS. 14B and 15). Each door frame assembly preferably has corresponding shelf brackets 163 (FIGS. 14A, 14B) for receiving and supporting the firewall mounting brackets 157. Specifically, the mounting brackets 157 are positioned on the shelf brackets 159 and fasteners are placed through the corresponding holes and tightened (strut nuts can be used to fasten the firewall structure in this manner). In this manner, the firewall 151 is mounted to the door frame assembly 50. The brackets 157, 163 cooperate with one another to accurately position the firewall to define the window opening above the firewall at the desired location. Consequently, even though mounted in place relatively late in the assembly process, the firewall-dashboard assembly does not interfere with subsequent window installation because of the accurate window opening definition. An engine tunnel 164 (FIG. 15) and left and right toeboard panels 166, 168, respectively, also may be attached to the firewall 151 by fasteners.

The present invention therefore avoids the need to install most of the dashboard and related components after the firewall has been attached to the cab structure. The firewall-dashboard assembly 150 may therefore be more ergonomically positioned (e.g. on a raised bench or the like) so as to allow assemblers to attach certain components to the firewall without having to place themselves in such awkward positions (e.g. crawling and reaching into difficult to reach locations) when assembling a firewall and components after the firewall is mounted to the truck cab. The firewall-dashboard assembly 150 is mounted to the truck cab after installing many of the interior cab components through the opening 120. In this way, the firewall-dashboard assembly, which partially closes the front opening in the truck cab assembly, does not significantly interfere with truck assembly during installation of interior cab components.

Having illustrated and described the principles of the invention in a preferred embodiment, it should be apparent to those skilled in the art that the embodiment can be modified in arrangement and detail without departing from such principles. This description illustrates certain embodiments of the present invention and should not be construed to limit the scope of the invention in any way. Other modifications and variations may be made without departing from the invention as defined by the appended claims and their equivalents.

We claim:

1. A process of assembling a truck cab, comprising:
    assembling a truck cab having a front opening, the front opening having a major portion below the windshield area of the truck cab which is unobstructed by vehicle components; and
    entering and exiting the front opening during the assembly process to install interior components in the truck cab.
2. The process of claim 1, wherein the assembling step comprises forming a truck cab assembly having sidewalls, a back wall, a floor structure, and a roof structure, and with a front opening substantially extending from sidewall to sidewall in a horizontal direction, and substantially extending from the roof structure to the floor structure in the vertical direction.
3. A process of assembling a truck cab, comprising:
    assembling a truck cab having a front opening, the front opening having a major portion below the windshield area of the truck cab which is unobstructed by vehicle components;
    entering and exiting the front opening during the assembly process to install interior components in the truck cab;
    the process also including moving the truck cab along an assembly line with the front opening of the truck cab oriented substantially perpendicularly to the direction of travel of the truck cab along the assembly line at least during a mayor portion of the truck cab interior assembly process.
4. The process of claim 3 including the step of mounting a firewall assembly to the truck cab assembly to partially close the front opening.
5. The process of claim 4, including the step of mounting a dashboard assembly to the firewall assembly to form a firewall-dashboard assembly prior to mounting the firewall assembly to the truck cab assembly.
6. A truck cab assembly, comprising:
    sidewalls;
    a back wall;
    a floor;
    a roof structure; and
    an opening through the front of the assembly, the opening substantially extending from sidewall to sidewall and from the floor of the cab to the roof structure, the opening allowing for easier egress and ingress into the truck cab for installing truck cab interior components.
7. The truck cab assembly of claim 6, wherein the truck cab assembly has first and second longitudinally extending floor supporting rails having forward end portions and also including a firewall assembly which is mounted to the forward end portions of the rails.
8. A truck cab assembly comprising:
    sidewalls;
    a back wall;
    a floor;
    a roof structure;
    an opening through the front wall assembly, the opening substantially extending from sidewall to sidewall and from the floor of the cab to the roof structure, the opening allowing for easier egress and ingress into the truck cab for installing truck cab interior components;
    wherein the truck cab assembly has first and second longitudinally extending floor supporting rails having forward end portions and also including a firewall assembly which is mounted to the forward end portions of the rails; and
    in which the firewall assembly is combined with a dashboard assembly including a dash console with an instrument panel prior to mounting the firewall assembly to the truck cab.
9. The truck cab assembly of claim 8 in which the firewall assembly is combined with a dashboard assembly including a dash console with an instrument panel prior to mounting the firewall assembly to the truck cab.
10. The truck cab assembly of claim 9, wherein the firewall assembly further includes a brake, a clutch, and an accelerator attached thereto prior to mounting the firewall assembly to the truck cab assembly.
11. A truck cab assembly comprising:
    sidewalls;
    a back wall;
    a floor;
    a roof structure;
    an opening through the front wall assembly, the opening substantially extending from sidewall to sidewall and from the floor of the cab to the roof structure, the opening allowing for easier egress and ingress into the truck cab for installing truck cab interior components;
    wherein the truck cab assembly has first and second longitudinally extending floor supporting rails having forward end portions and also including a firewall assembly which is mounted to the forward end portions of the rails; and
    wherein the sidewalls each include a door frame, and wherein the door frames and firewall assembly include cooperating mounting brackets which position the firewall on the door frame to define a lower boundary of a truck windshield window opening.

\* \* \* \* \*